(12) United States Patent
Meritt

(10) Patent No.: US 9,278,813 B2
(45) Date of Patent: Mar. 8, 2016

(54) APPARATUS FOR DIRECTIONALLY DISCHARGING FEED

(71) Applicant: RICK MERITT INVESTMENTS, LTD.

(72) Inventor: Rick Meritt, Gilmer, TX (US)

(73) Assignee: Rick Meritt Investments, Ltd., Gilmer, TX (US)

( * ) Notice: Subject to any disclaimer, the term of this patent is extended or adjusted under 35 U.S.C. 154(b) by 579 days.

(21) Appl. No.: 13/674,684

(22) Filed: Nov. 12, 2012

(65) Prior Publication Data

US 2014/0131468 A1    May 15, 2014

(51) Int. Cl.
| | |
|---|---|
| *B05B 17/04* | (2006.01) |
| *B65G 31/04* | (2006.01) |
| *A01C 17/00* | (2006.01) |
| *A01C 15/00* | (2006.01) |
| *A01C 15/04* | (2006.01) |
| *E01C 19/20* | (2006.01) |
| *E01H 10/00* | (2006.01) |
| *A01K 5/02* | (2006.01) |

(52) U.S. Cl.
CPC ............... *B65G 31/04* (2013.01); *A01C 15/00* (2013.01); *A01C 15/04* (2013.01); *A01C 17/001* (2013.01); *A01C 17/006* (2013.01); *A01K 5/0225* (2013.01); *E01C 19/203* (2013.01); *E01C 19/205* (2013.01); *E01H 10/007* (2013.01)

(58) Field of Classification Search
CPC .... A01C 17/001; A01C 17/006; A01C 15/00; A01C 15/04; E01C 19/203; E01C 19/205; E01H 10/007; B65G 31/04; A01K 5/0225
USPC .............. 239/506, 650, 654, 681, 687, 689; 119/56.1, 57.91
See application file for complete search history.

(56) References Cited

U.S. PATENT DOCUMENTS

| | | | | |
|---|---|---|---|---|
| 4,480,794 | A | * | 11/1984 | Fuss et al. ..................... 239/654 |
| 4,986,220 | A | * | 1/1991 | Reneau et al. ............. 119/57.91 |
| 5,820,035 | A | * | 10/1998 | Johnson et al. ............... 239/687 |
| D517,930 | S | | 3/2006 | Chism |
| 7,306,175 | B1 | * | 12/2007 | Farmer .......................... 239/650 |
| 7,866,579 | B2 | | 1/2011 | Chism |
| 2010/0307421 | A1 | | 12/2010 | Gates |
| 2011/0088627 | A1 | | 4/2011 | Gates |

* cited by examiner

*Primary Examiner* — Steven J Ganey
(74) *Attorney, Agent, or Firm* — Gardere Wynne Sewell LLP

(57) ABSTRACT

An apparatus for containing and dispensing material includes a container enclosing a quantity of the material and a discharge unit operably associated with the container. The discharge unit comprises an entry port, a rotational assembly, an impeller, and an exit port. The rotational assembly includes a rotatable plate that retracts away from the entry port when the plate and the impeller are rotating. The plate remains in an abutting relationship with the entry port when not rotating.

22 Claims, 4 Drawing Sheets

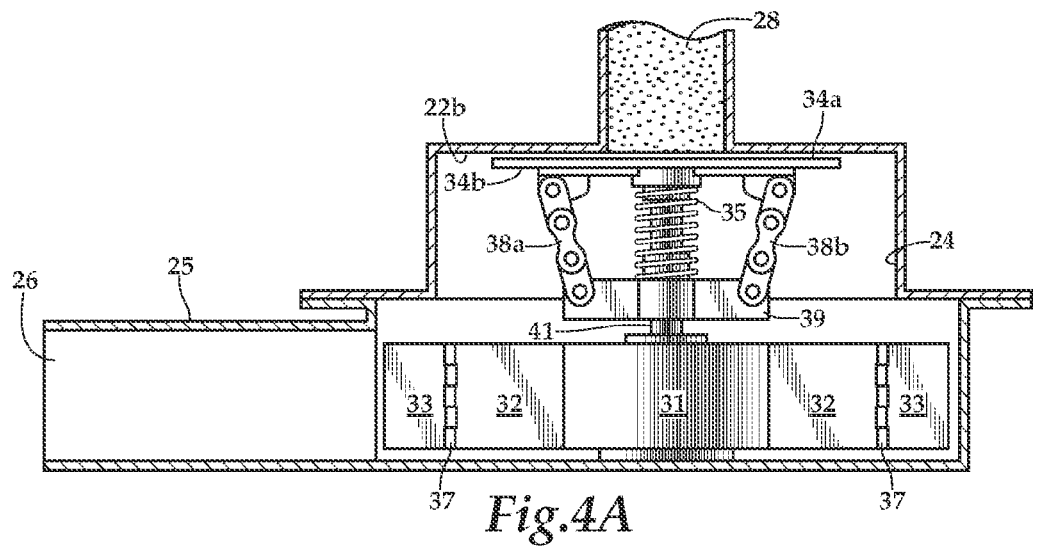
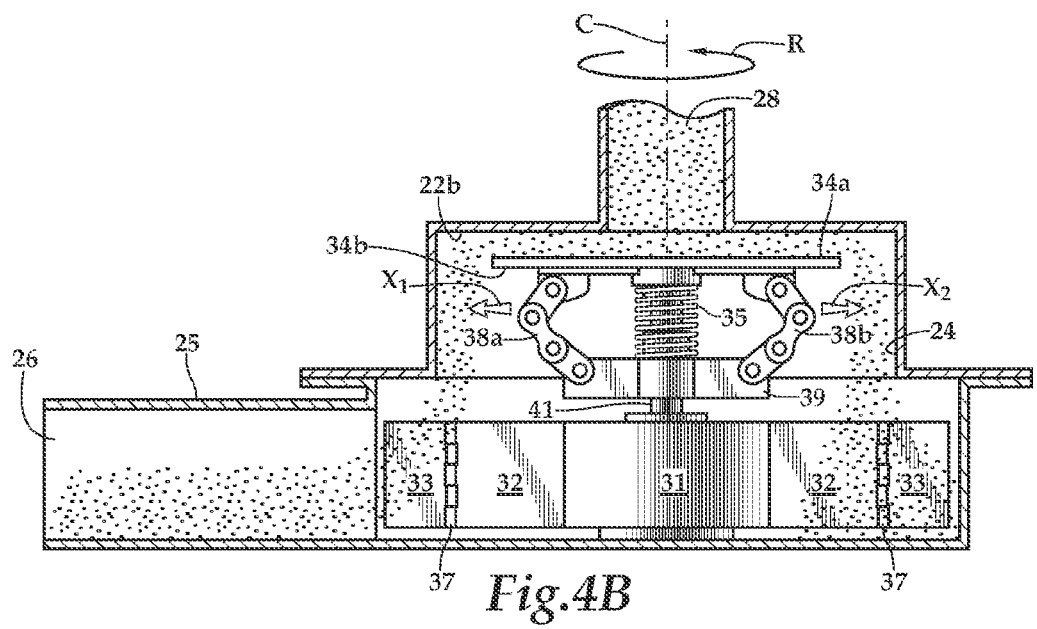

APPARATUS FOR DIRECTIONALLY DISCHARGING FEED

TECHNICAL FIELD

The invention described relates generally to an apparatus for feed or other material, and more particularly to an apparatus for unattended and directionally dispensing and spreading said feed or other material.

BACKGROUND

There is a continuing need for improvements in apparatus that may be placed unattended at a location for an extended period of time and provide feed or other material for a given duration, including improvements in controlling the flow and quantity of material being dispensed while protecting the material from environmental elements. These and other improvements are met by the embodiments described herein.

SUMMARY

An apparatus for directionally discharging material is described. The apparatus comprises a housing having a chamber with at least one inlet into the chamber and a barrel defining at least one outlet. A rotational assembly is disposed within the chamber, wherein the rotational assembly includes a plate rotatable about a central axis. The plate is further operably associated with a support assembly for supporting the plate and positioning the plate to block the at least one inlet when in a first position. When the plate is rotating, the plate retracts away from blocking the at least one inlet. An impeller is spaced apart from the rotational assembly and rotatable about the central axis. Rotation of the plate and the impeller allows material to enter the chamber through the at least one inlet.

According to one embodiment, the apparatus includes a container for containing the material. The container is coupled to the housing. In certain embodiments, the rotational assembly further comprises a motor and drive shaft. The support assembly further comprises a support element comprising extending arms for supporting pivotable members and a central portion for supporting a spring about the central axis. The housing typically comprises two pieces cooperatively joined together. The impeller may include a plurality of blades each having respective hinged portions.

Also described herein is a method for directionally discharging material in connection with an apparatus for containing and discharging material comprising rotating an assembly disposed in a chamber defined by a housing. The chamber includes at least one entry port into the chamber and a barrel defining at least one outlet. The assembly includes a plate and at least one support member both rotatable about a central longitudinal axis. An impeller also rotates to discharge the material from an extension of the housing. Rotating the plate and the impeller causes the plate to translate along the central longitudinal axis such that the plate, initially positioned to block the material from flowing through the at least one entry port, retracts away from the at least one entry port. The assembly further comprises a motor and drive shaft. The support member includes extending arms for supporting pivotable members and a central portion for supporting a spring about the central axis. Rotating creates a centrifugal force that causes the pivotable members to pivot.

Those skilled in the art will further appreciate the advantages and superior features described upon reading the description which follows in conjunction with the drawings.

BRIEF DESCRIPTION OF THE DRAWINGS

Additional features, as well as more details thereof, and the overall systems and devices described herein, will become readily apparent from a review of the following detailed description, taken in connection with the accompanying drawings, in which:

FIG. 4A depicts a representative internal view of a discharge unit in a non-operating position;

FIG. 4B depicts a representative internal view of the discharge unit in an operating position;

DESCRIPTION

Figure 1:
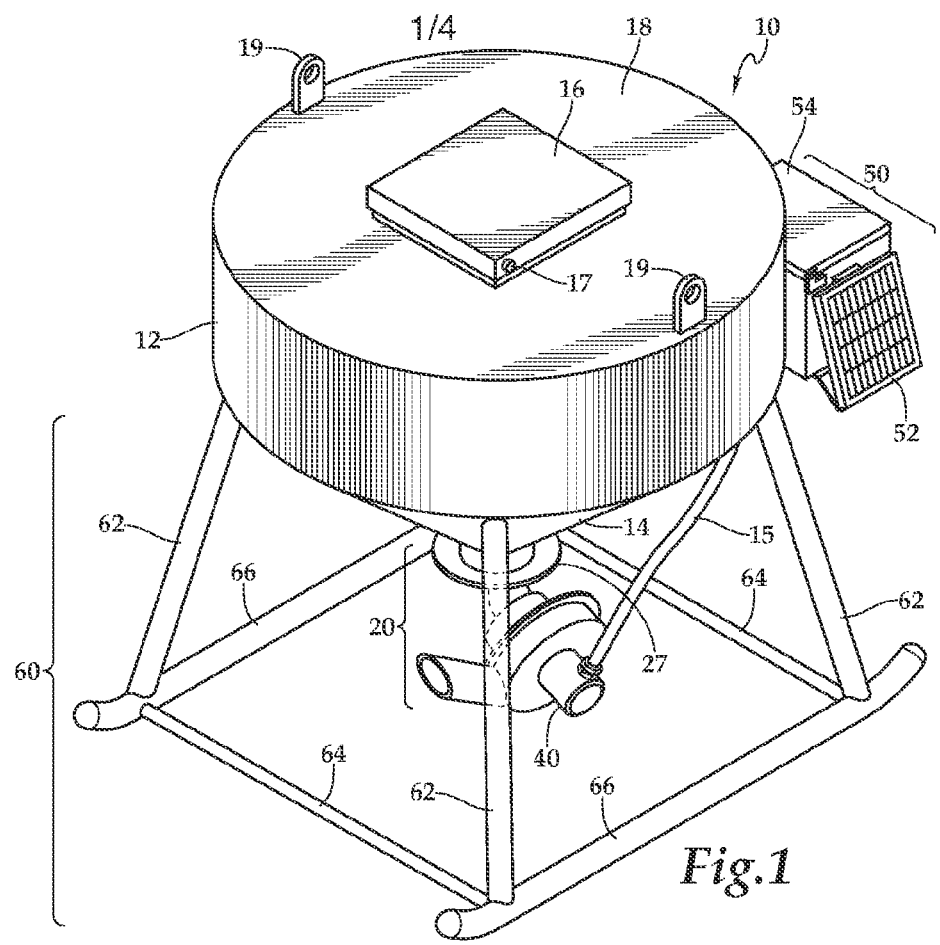
FIG. 1 is a perspective view of a representative feed apparatus described herein.

With the detailed description, like elements are marked throughout the specification and drawings with the same reference numerals, respectively. The drawing figures are not necessarily to scale and certain elements are shown in generalized or schematic form in the interest of clarity and conciseness. It should be understood that the embodiments of the disclosure herein described are merely illustrative of the principles of the invention.

Referring first to FIG. 1 there is illustrated a representative embodiment of an apparatus 10 for directionally discharging material comprising a container 12, a discharge unit 20, control unit 50 and support structure 60. As is understood by one of ordinary skill in the relevant art, placement of each of the container, discharge unit, support structure and control unit is not limited to what is shown. Moreover, some embodiments contemplated may include more than one container, discharge unit, support structure and/or control unit in similar or alternative configurations than shown, provided material is discharged and/or spread from the discharge unit and the apparatus may be unattended while operating.

Container 12, which is shown to be generally cylindrical, may be any alternative shape provided it is capable of holding a quantity of material, preferably but not limited to particulate and/or granular material, such as but not limited to animal feed. Additionally or alternatively, said material may be vitamins, fertilizer, seed, and the like as suitable examples.

Container 12 includes an uppermost portion bounded by cover 18, a continuous side wall portion and a lowermost portion operably associated with discharge unit 20. In FIG. 1, container 12 is illustrated with an entry portal 16 on cover 18 to allow access to the inside of container 12 without requiring the removal of cover 18. In addition or as an alternative, an entry portal may be positioned on a portion of the continuous side wall. It is also contemplated that in some embodiments an entry portal will not be required. Entry portal, when used will generally include a cover for preventing unauthorized access into container 12 and optionally a means for joining the cover to container 12, depicted in FIG. 1 as hinge 17, which may include or may further comprise a lock or other means for preventing unauthorized access into as well as unauthorized addition or removal of contents in container 12. The container may also, when desired, include connectors 19. Connectors 19 may be positioned on cover 18, as illustrated, to assist in the removal of cover 18 from container 12. In addition or as an alternative, connectors may be positioned elsewhere on the exterior of apparatus 10 or container 12, such as the side wall of container 12, which may provide a way to move apparatus 10 from one location to another.

Container 12 is, in a first embodiment, positioned in order that the contents in container 12 descend into discharge unit 20. The descent is typically by gravity; however, additional or alternative means for moving material from container 12 to discharge unit 20 are contemplated, as would be understood by one of skill in the relevant art, such as by applying a force or pressure. In alternative embodiments, material from container 12 may move to discharge unit 20 by other means, such as with fluid flow (e.g., via a means for directing fluid flow and/or by creating a pressurized system, such as a pump, air or gas circulator, or other pneumatic or hydraulic device). In some embodiments, container 12 is integral with or in direct association with discharge unit 20. In other embodiments, there may be a conduit or passage between container 12 and discharge unit 20. Thus, a lower most portion of container 12 may itself be shaped in order to allow descent of material into discharge unit 20. The drawings show a lower channel 14 operably associated with both container 12 and discharge unit 20. The channel 14 may be any suitable shape to direct the flow of feed from the container 12 into the discharge unit 20 and may be directly integral with container 12, such that the container is so shaped to include channel 14, or channel 14 may be joined with container 12 by any means for joining, including but not limited to welding, clamping, adhesion, hooking, screwing, binding, and the like. In one or more embodiments, as shown, channel 14 is conical in shape, such that an uppermost portion of channel 14 has a cross sectional diameter that is greater than the cross sectional diameter of its lowermost portion. When included, channel 14 facilitates entry of material from the container to the discharge unit. Additional shapes may also be used, not all of which require a conical shape. Like container 12, channel 14 may further comprise longitudinal grooves or extensions on its interior surface that may facilitate movement of material from container 12 to discharge unit 20.

Typically, container 12 as well as its accompanying components, such as its cover, entry portal, entry portal cover, channel, and one or more connectors, are of a non-corrosive material, such as steel. Other non-corrosive materials (e.g., metal, metal alloys, plastics or composites), particular those that are weather resistant, are also contemplated and acceptable for use.

Figure 2:
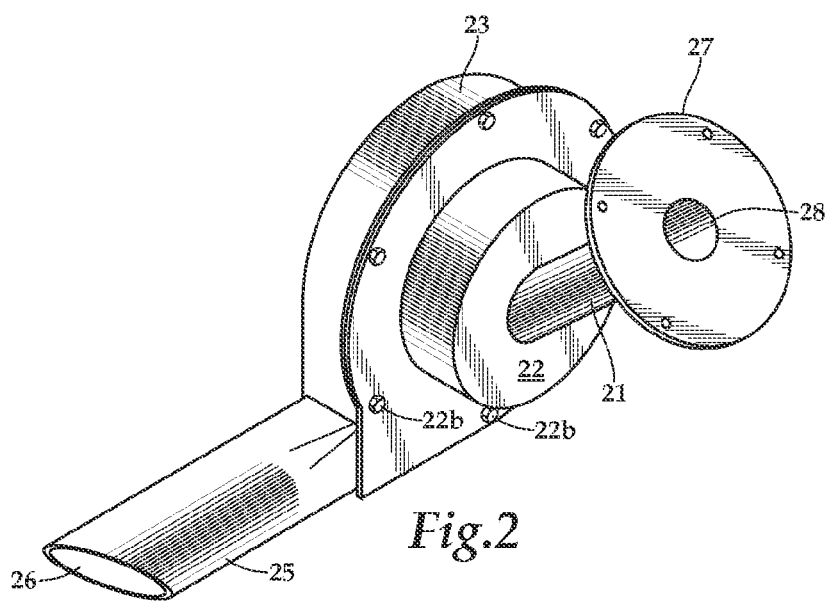
FIG. 2 depicts one representative embodiment of a discharge unit described herein.
Figure 3:
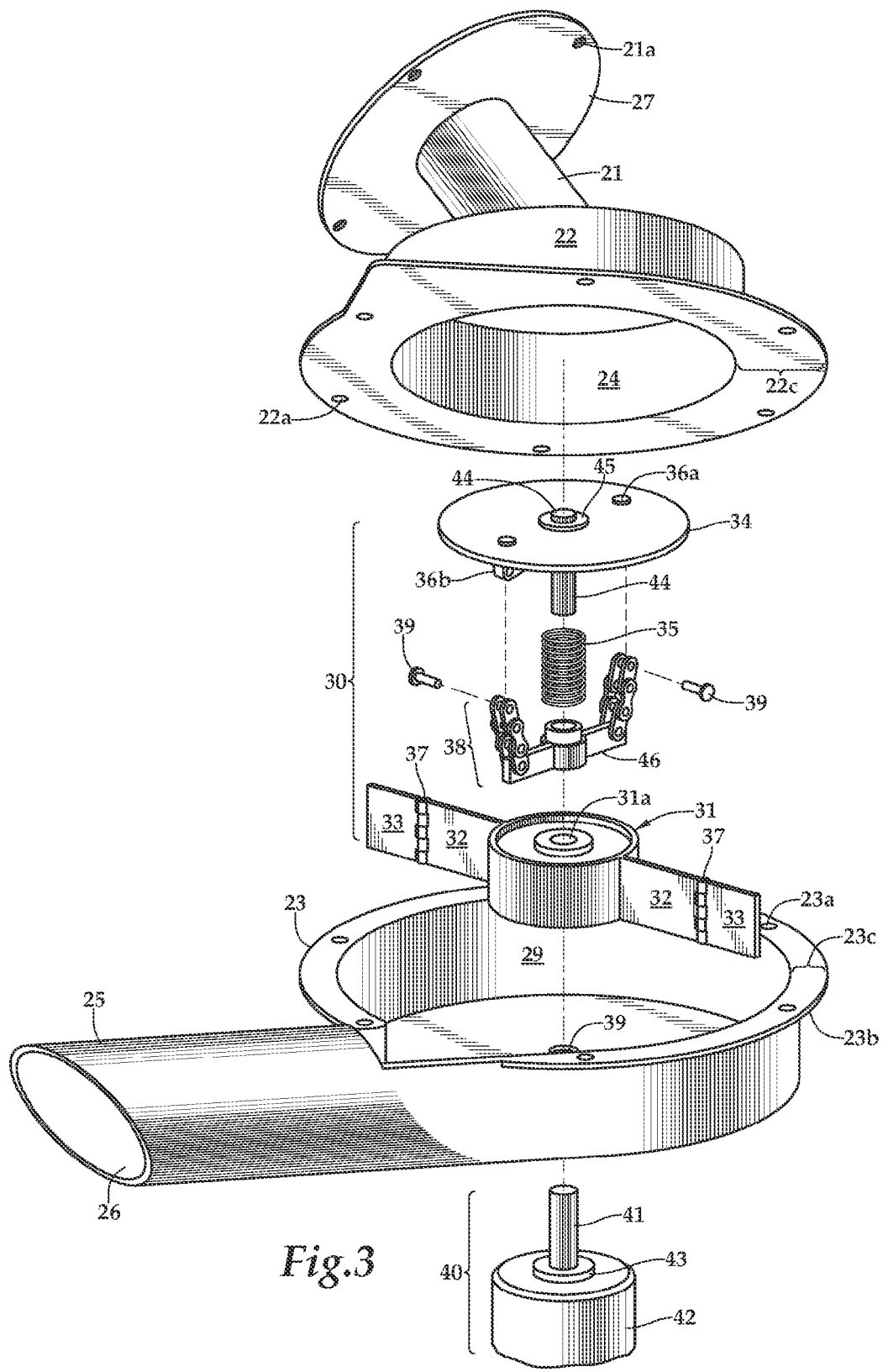
FIG. 3 depicts an exploded view of a representative discharge unit described herein.

Referring now to FIGS. 2 and 3, representative embodiments of the discharge unit 20 are illustrated. The discharge unit shown includes exterior elements and interior elements. The exterior elements include cap 22, casing 23 with extension or barrel 25 and exit port 26 as well as an optional flange portion 27 and optional conduit 21. While only one barrel 25 and exit port 26 are depicted, it is understood that more than one as well as a plurality of extensions and exit ports may added to the apparatus in order to further discharge and spread the material. The barrel 25 serves to direct the feed in a desired direction, which may be an improvement over feeders that may spread feed more randomly around the feeder. In addition, the barrel 25 may extend six to twelve inches and may be scarfed at the exit port 26. Extension of the barrel away from the casing may keep animals from reaching and damaging any of the components of the rotation assembly 30 as the animal attempts to get any residual feed in the casing. The barrel 25 and the exit port 26 may be sized and shaped to prevent animals from inserting their snouts in the barrel and possibly damaging the components of the rotation assembly 30.

According to alternate embodiments of the present disclosure, the dimensions of the barrel 25 and the exit port 26 each may also differ from what is shown. For example, to distribute the material over a larger area, said extension may be shorter and wider or even flange outwardly at the end of port 26. A plurality of barrels at different lengths and positions may also facilitate distribution.

It is also understood that either or both of flange portion 27 and conduit 21 may not be required when channel 14 is so shaped to operably associate directly with cap 22. Flange portion 27 having bores 21a for joining with container 12, as shown, is only one embodiment contemplated and may or may not be part of the lowermost portion of channel 14. In some embodiments, flange portion 27 may be joined to channel 14, which will be by any means known in the relevant art for joining said components. It is further understood that the flange portion may be absent and other methods of operably associating and/or joining channel 14 with conduit 21 or with cap 22 may be provided, as is understood by one of skill in the relevant art. Generally, the exterior elements of the discharge unit are joined in any suitable manner that minimizes exposure of the interior elements. The discharge unit 20 may be coupled to any suitable container 12 or hopper for storing feed. In this manner, a user may convert an existing hopper or unattended gravity flow feeder into a feeder with the directional discharge and spreading functionality described herein.

As illustrated, a conduit 21 is used in one embodiment as a means for supplying material from container 12 to the discharge unit 20. Again, it is possible that a lowermost portion of container 12 (by way of channel 14) is so shaped as to eliminate a need for conduit 21. In addition, conduit 21 may be merely an extension of container 12 by way of channel 14. In any design, the discharge unit will be below container 12 when the movement of material relies primarily on gravity. The discharge unit may also be on the same horizontal plane as a portion of channel 14 or when not relying only on gravity, the discharge unit may be above channel 14. Thus, the placement of discharge unit 20 with respect to container 12 is not limited to what is shown in FIG. 1. Generally discharge unit 20 may be placed in any location with respect to container 12 as long as there is a means for supplying the material within container 20 to discharge unit 20, which includes a force (i.e., gravitational force, a pulling force, a pushing force, and various combinations thereof).

Material enclosed in container 12 enters the discharge unit through inlet 28. Essentially, inlet 28 may be the interior of container 12, the interior of channel 14, the interior of conduit 21 or the interior of any additional coupling elements continuous with the entry portal into discharge unit 20. Material from container 12 (often by way of channel 14) will move to discharge unit 20 via inlet 28, which has a space therein that is continuous with an entry portal into the interior of the discharge unit 20. As previously described, container 12 may or may not include additional conduits, such as conduit 21, for entry of material to discharge unit 20.

Through the inlet cavity 28 material enters cap 22, which is tightly fitted with casing 23. The fitting may or may not be permanent. FIG. 3 depicts an end region 22c of cap 22 and an end region 23c that so abut to fully enclose an interior rotation means and assembly. The cooperative ends regions of the cap and casing may but do not need to extend outwardly as depicted in the drawings. As such, alternative methods of shaping and fitting the cooperative ends of the casing and the cap are also contemplated, including but not limited to having no lip or extended region, press fitting, interlocking, and/or overlapping said cooperative ends. The cooperative fitting will typically include a joining that will minimize exposure of the interior elements, such as but not limited to adhesion, welding, riveting, fastening, clamping, hooking, screwing, binding and the like. In FIGS. 2 and 3, a number of holes 22a and 23a are illustrated for joining the cap and casing, which are compatible with fasteners, such as depicted in FIG. 2 as fasteners 22b. Casing 23 further comprises an extending portion 25 that has an internal space therein, such that the internal space of extending portion 25 is continuous with the internal space within cap 22 and casing 23 to allow the material that enters cap 22 to depart from exit port 26. Thus, there is an interior space that is continuous from entry into cap 22 to casing 23 and extension portion 25. It is understood that the extension 25 may be longer and/or wider to discharge more material or discharge further from the apparatus when desired.

The interior elements of discharge unit 20 include a rotation assembly 30 and at least a portion of a motor assembly 40. The rotation assembly includes an impeller 31 with at least two outwardly extending blades 32 for throwing the feed. In one embodiment, the blade 32 includes a hinged portion 33. A hinge 37 allows the hinged portion 33 to rotate or pivot. When the impeller 31 is not spinning, the hinged portion 33 may pivot away from the interior wall 29 of the casing 23. In this manner, the blade 32 may be prevented from being jammed by feed that may otherwise be disposed between the hinged portion 33 and the interior wall. Upon operation of the rotational assembly 30 to cause the impeller 31 to spin, a centrifugal force causes the hinged portion 33 to extend generally parallel to the blade 32 and be disposed closer to the interior wall 29. With the hinged portions 33 in their extended positions, the impeller 31 can direct substantially all of the feed in the internal space of casing 23 to be discharged from the exit port 26. Thus, the blades 32 may be of a sufficient length that they are able to clear material from the interior wall 29 of casing 23. The clearing of material may include a surface to surface contact (e.g., rubbing or scraping) of an end portion along the interior wall 29 of casing 23. The impeller 31 configurations disclosed herein may function to flow feed further than conventional feed spreader systems.

Figure 6:
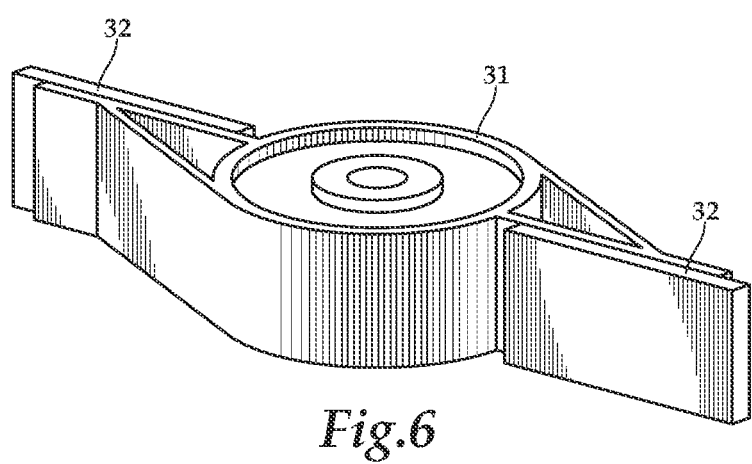
FIG. 6 depicts an alternative embodiment of an impeller described herein.

An alternate embodiment of the impeller 31 is illustrated in FIG. 6. FIG. 6 illustrates the impeller with two blades 32 extending from an internal portion. Other embodiments may include one or more than two blades 32, for example 3 blades 32 may extend from the internal portion. The blades 32 extend outwardly with ends proximate to or spaced a short distance away from the interior wall 29 of casing 23. In some embodiments, it is contemplated that ends of blades 32 may have some contact with interior wall 29 of casing 23. As an alternative, though not shown, primary blades 32 may be angled.

While the blades 32 are typically made from a durable material that is stiff and unlikely to bend significantly during rotation of the impeller 31, the blades 32 may also be made of a more flexible material. The flexible material may function similar to the hinged portion 33 and may allow the blade 32 to be fabricated without a hinge 37. In addition, the blades 32 may also comprise two materials, such that the blades 32 are less flexible when nearest a centermost portion (see 31a of the assembly in FIG. 3) and more flexible when further away from the centermost portion. A metal or hard yet durable plastic are suitable exemplary materials for blades 32. Suitable examples of more flexible materials include a flexible yet durable plastic, silicone, or rubber or variations thereof.

Movement of impeller 31 and blades 32 (with or without blades 33) are directed by motor assembly 40, which has a drive shaft 41, rotatable in bearing 43, and which extends from the motor unit 42 through a centermost portion 31 a of impeller 31. The drive shaft is operably coupled to assembly elements 44, 45, 46, which together facilitate the support of plate 34 and rotation of plate 34 when drive shaft 41 is rotated. Members 38, having two ends, couple to plate 34 at or near one end and couple to assembly element 46 at or near its other end. With the described coupling, plate 34 and assembly element 46 rotate in unison. Members 38 are joined typically to an outer more portion of plate 34. With at least two or more members 38, the members are positioned equidistant apart. Members 38 are also joined to assembly element 46 at an outer portion of its radially extending arms. Plate 34, compression spring 35, and members 38 may be obtained as a pre-assembled scatter plate from West Texas Feeder Supply of Odessa, Tex. U.S. Pat. No. 7,866,579, the disclosure of which is hereby incorporated by reference, discloses a feed spreader including an assembly with components similar in form and function to plate 34, compression spring 35, and members 38.

Generally, element 46 will have enough radially extending arms, placed equidistant from each other, to operably join with each member 38. Members 38 are joined by any means for joining that also provides a moveable joint or hinge region between member 38 and plate 34 as well as between member 38 and element 46. In addition, each member 38 operates, itself, as a moveable joint, hinge or pivot. In one embodiment, member 38 may be a single, flexible unit. In still another embodiment, members 38 may be of two or more flexible, moveable and/or pivoting units. FIGS. 3, 4A and 4B depict members 38 as comprising a plurality of coupling units or linkages that allow movement and/or pivoting between each coupling unit or linkage. In the drawings, the representative coupling units are joined by joining elements or pins 39. Further means for joining are represented in the drawings by connectors 36a, 36b. Means for joining (e.g., for moveable joints and between units or linkages) may further comprise that which is known to one of skill in the art as described previously, and may also include any of shackles, links, anchors, hinges, swivels, hooks, eyebolts, turnbuckles, clips, eye nuts, and the like, and various combinations thereof.

Rotation of drive shaft 41 rotates impeller 31 and assembly elements 44, 45, 46. With rotation there is also a translation of plate 34 from a first position, as depicted in FIG. 4A, to a second position, as represented in FIG. 4B. Thus, when motor assembly is idle or not operating, plate 34 is in its first position, which is facilitated by an extended (generally unbent) position of members 38 and biased by a spring load from compression spring 35. In the first position of plate 24, a first surface 34a of plate 34 is closely associated with or in contact with inner wall surface 22b of cap 22, at least around and near inlet 28 (FIG. 4A). At a minimum, plate 34 will have a length sufficient to cover inlet 28 when plate 34 is in its first position. Plate 34 may also extend outwardly in length so that it is near inner side wall 24 of cap 22; however, plate 34 may not contact inner side wall 24. The first position of plate 34 prevents material in container 28 from entering the discharge unit 20. While shown to have a circular shape, plate 34 may have any suitable shape capable of meeting the length requirements that encompass the cross sectional diameter of inlet 28.

Plate 34 translates and retracts from its first position to its second position with operation of the motor, which rotates drive shaft 41 as well as assembly elements 44, 45, 46, in unison with plate 34. Plate 34 may rotate in either one of two directions, one of which is depicted by arrow R. Translation of plate 34 away from inner wall surface 22b is provided by an outward force in the direction of opposing arrows $X_1$ and $X_2$, extending away from the center of rotation depicted as line C (FIG. 4B). The rotation in combination with the outwardly extending force (centrifugal force) flexes members 38 about its one or more moveable joint portions, pivots or hinge areas. As represented in FIG. 4B, member 38a flexes outwardly in the direction of arrow $X_1$ and member 38b flexes outwardly in the direction of arrow $X_2$. The forced outward flexion or bending of member 38 translates (retracts) plate 34 to its second position, as represented in FIG. 4B. In its second position, first surface 34a of plate 34 is no longer associated with and/or in contact with inner wall surface 22b of cap 22. With retraction of plate 34, spring element 35 is compressed. As such, spring element also translates from a first position, in the absence of rotation, to a second position, which is a more compressed (loaded) position when the rotational assembly is operating.

With retraction of plate 34, it is released from its first position and from its close association and/or contact with inner wall surface 22b of cap 22. Furthermore, retraction permits opening of inlet 28 allowing material contained in inlet 28 to enter discharge unit 20 (FIG. 4B). The motor assembly also rotates impeller 31 with rotation drive shaft 41, which facilitates the discharge of material from casing 23 by way of extension 25 via outlet 26. Thus, embodiments disclosed herein allow simultaneous opening of the inlet 28 and throwing of the feed by the rotation of the impeller 31. As such, the discharge unit 30 is fully operational with only a single power source (battery) and a single motor. In addition, as described in more detail below, the discharge unit is operational with only a single stage timer. The simultaneous rotation of the impeller and the retraction of plate 34 significantly simplifies the discharge unit 30 and allows operation of the discharge unit 30 with less components.

The motor assembly 40 may be operated over a predetermined period of time followed by intervals when the motor is not operating, no feed is being spread, and the inlet 28 is closed. Upon initial activation of the motor assembly 40, the discharge unit operates as described above—the plate retracts to allow feed into the casing 23 where it is thrown by the rotation of the impeller 31. When power is cut to the motor assembly 40, the motor assembly 40 will freewheel and rotational inertia will cause the impeller 31 (and the plate 34) to continue to rotate. The plate 34 will be in its closed position during this freewheel rotation, and thus the inlet 28 will be blocked. However, the continued rotation of the impeller 31 will continue to throw residual feed from the interior of casing 23, and thus perform a self-cleaning functionality to rid the interior of the casing of feed that may otherwise clog the discharge assembly and hinder either feed flow through the inlet or rotation of the impeller 31.

Rotation is directed by control unit 50, which is depicted in FIG. 1 as separable from the discharge unit 20 and motor assembly 40. In FIG. 1, motor assembly 40 is adjacent casing 23 while extending from motor assembly 40 is a conduit 15 that provides wiring to/from control unit 50 to motor assembly 40.

The motor assembly is powered by a power source, such as a battery or by an alternating current. When powered by a battery, it is generally located with the control unit along with a controller, which is engaged with the battery for activating and inactivating the battery, and optional features, such as a timer, alarm, keyboard or push button or other interface to input parameters and data, as well as possible microchips or indicators (e.g., LED indicator) that provide a digital or analog readout or display of certain desired features of the apparatus as well as an optional pump or circulator (when there is directed air or fluid flow to assist in movement of material from container to discharge unit). Also optional is a remote unit (wired or wireless) that is provided with the control unit for remote operation of the apparatus.

Figure 5:
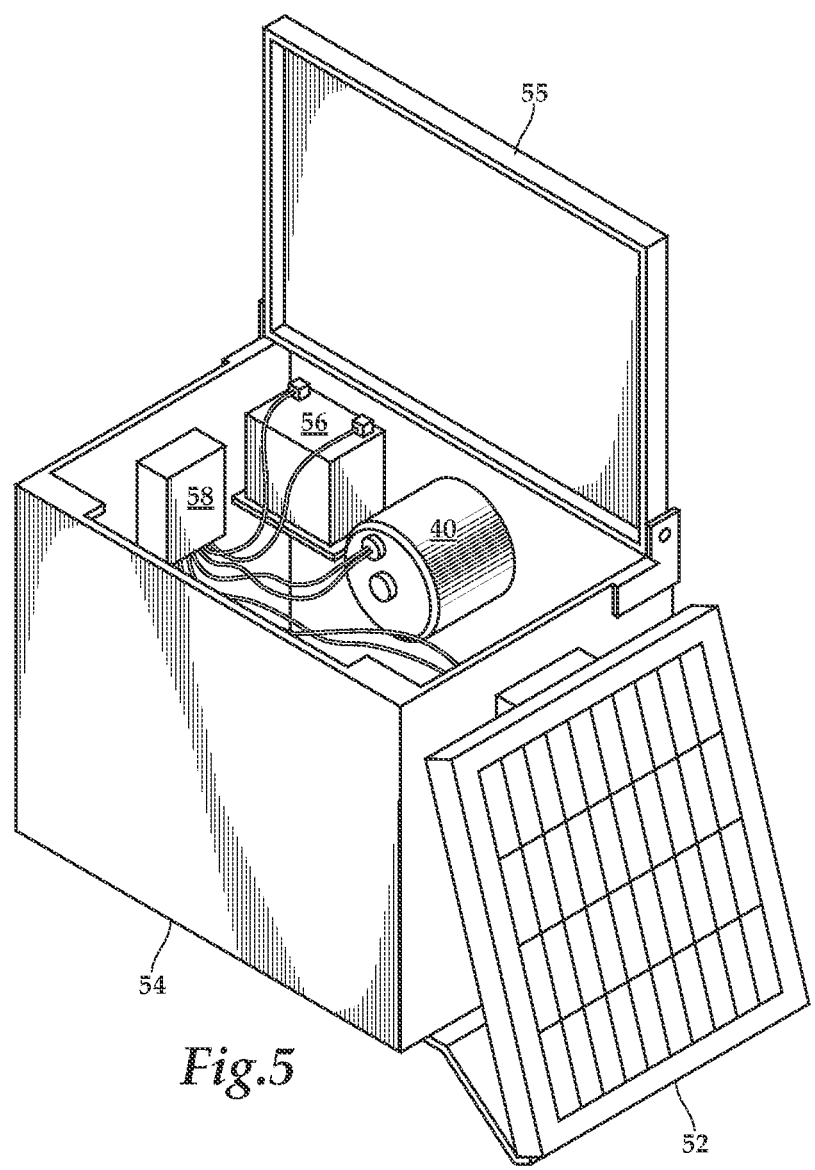
FIG. 5 depicts a view in perspective of representative components of a control unit of FIG. 1.

In one or more embodiments, the power source is a solar battery, which, if combined with a higher voltage solar panel, may require a solar controller or regulator. The solar battery is typically coupled with a solar panel for charging. However, it is understood that some solar batteries are, themselves, capable of charging when exposed to sun. The power source and/or its controller or regulator are typically located with the control unit. An example of a solar powered control unit is illustrated in FIGS. 1, 2 and 5, in which a solar panel 52 is positioned outside the control unit while other features of the control unit, such as battery unit 58 and controller 56 are contained within a control unit housing 54. Easy access to the interior of the control unit housing may be provided by moveable lid 55. With use of solar power, the solar panel 52 will be positioned for optimal direct sunlight. As such, in some embodiments, the solar panel may be above the control box.

The control unit housing 54 protects the interior features and is typically made of a durable and weather resistant material. An accompanying lid 55, which provides access to the interior of the housing may include a window allowing sunlight in (e.g., when using a solar battery rechargeable by the sun). The control unit housing 54 is generally mounted to the apparatus. In FIG. 1, housing 54 is mounted to container 12. As an alternative, the housing 54 may abut and be joined with a portion of the discharge unit 20, as depicted in FIG. 2. In this embodiment, a majority of the motor assembly 40 is located within control unit housing 54, as represented in FIG. 5, with the drive shaft extending from the motor assembly into the interior of casing 23 through aperture 39, as represented in FIG. 3.

A representative orientation of discharge unit 20 is depicted in FIG. 1. The representative orientation is only an exemplary embodiment, since discharge unit may be oriented in any direction. In some embodiments, the orientation will be such that gravity is relied on for material from container 12 to enter and exit the discharge unit 20. In other embodiments, gravity in combination with an additional force (e.g., fluid or air pressure) is relied on for material from container 12 (typically via channel 14) to enter and exit the discharge unit 20. Still other embodiments may rely only on the additional force without gravity to ensure material from container 12 enters and exits the discharge unit 20.

The apparatus described is supported by a suitably sufficient support structure that allows the apparatus to be unattended. The support structure may support the apparatus from below or may support from above, both of which permit the apparatus to be elevated and off the ground. A representative support structure is illustrated in FIG. 1 showing apparatus 10 mounted on a plurality of tubular legs 62 supported by beams 66 and braced with cross brace members 64. Beams 66 are shown with raised ends that facilitate further movement of the apparatus when positioning on the ground. Alternative shapes than what is shown for legs, beams and cross brace members are also contemplated. In addition, wheels or rollers may be provided with the support structure for ease in moving the apparatus during or between operations. Said features are included when appropriate or desired.

The size of the apparatus 10 (excluding the support structure) is determined by its application. For long term use, in which the apparatus is to remain unattended for longer periods of time, the apparatus, particularly its container, will be suitably sized to contain a large quantity of material that may be discharged over a number of hours, days, weeks, months or more. For short term use, the apparatus may be stationary or may be mobile, either having its own powered mobility or by placing on a mobile carrier (e.g., cart, flatbed, truck, or the like).

To operate at various predetermined time intervals, the motor assembly may be suitably programmed and controlled by the control unit, as needed. In addition, the programming may, in certain embodiments, be performed remotely. Operation of the discharge unit (via the motor assembly) may be manual or may be automatic, at any interval desired or appropriate, and may be regular or irregular, on an hourly basis, daily basis, weekly basis, etc. Moreover, the rate of rotation of the rotation assembly (e.g., via rotation rate of the drive shaft) may vary depending on the desired rate of discharge as well as the desired spread of material away from the discharge unit. It is further contemplated that the container and/or the inlet to the discharge unit may be fashioned to allow more or less material to enter the discharge unit. For example, flow controls (e.g., valves, baffles) may be included within the apparatus (e.g., container, container channel, conduit and/or casing extension) to regulate the amount of material that enters and/or exits the discharge unit during operation.

The foregoing description is of exemplary embodiments and methods for operation. The invention is not limited to the described examples or embodiments. Various alterations and modifications to the disclosed embodiments may be made without departing from the scope of the embodiments and appended claims.

The invention claimed is:

1. An apparatus for directionally discharging material, comprising:
   a housing having a chamber with at least one inlet into the chamber and a barrel defining at least one outlet;
   a rotational assembly disposed within the chamber and including a plate rotatable about a central axis and blocking material from entering the chamber through the at least one inlet in a first position;
   an impeller disposed within the chamber and coupled to the rotational assembly, the impeller being rotatable about the central axis to discharge the material from the at least one outlet; and
   wherein rotation of the plate and the impeller allows the material to enter the chamber through the at least one inlet.

2. The apparatus of claim 1, wherein the rotational assembly further comprises a motor and drive shaft.

3. The apparatus of claim 1, further comprising a support assembly supporting the plate, the support assembly comprising flexible members, centrifugal force on the flexible members causing retraction of the plate to a second position.

4. The apparatus of claim 1, wherein rotation of the impeller and the plate causes the plate to retract from blocking the at least one inlet.

5. The apparatus of claim 1, wherein the impeller includes a plurality of blades, each blade having a hinged portion pivotably coupled via a hinge to a fixed portion.

6. The apparatus of claim 1, wherein the impeller includes a plurality of fixed blades.

7. The apparatus of claim 1, wherein the barrel includes a scarfed end defining the at least one outlet.

8. The apparatus of claim 1, wherein the rotational assembly further comprises a compression spring biasing the plate to block the at least one inlet.

9. The apparatus of claim 1, wherein the impeller is disposed within the chamber such that rotation of the impeller directs the material from through the barrel.

10. An apparatus for directionally discharging material, comprising:
    a container for storing a material;
    a housing coupled to the container and defining a chamber with at least one inlet into the chamber and a barrel defining at least one outlet;
    a rotational assembly disposed within the chamber and including a plate rotatable about a central axis and blocking material from entering the chamber through the at least one inlet in a first position;
    an impeller disposed within the chamber and coupled to the rotational assembly, the impeller being rotatable about the central axis to discharge the material from the at least one outlet; and
    wherein rotation of the plate and the impeller allows material to enter the chamber through the at least one inlet.

11. The apparatus of claim 10, wherein the container further comprises a cover.

12. The apparatus of claim 10, wherein the rotational assembly operates automatically at predetermined intervals.

13. The apparatus of claim 10, wherein a power source operable to rotate the rotational assembly is charged by solar power.

14. The apparatus of claim 10, wherein rotation of the impeller and the plate causes the plate to retract from blocking the at least one inlet.

15. The apparatus of claim 14, further comprising a support assembly supporting the plate, the support assembly comprising pivotable members, centrifugal force on the pivotable members causing retraction of the plate to a second position.

16. The apparatus of claim 10, wherein the rotational assembly further comprises a motor and a drive shaft.

17. The apparatus of claim 10, wherein the barrel extends away from the impeller and defines a direction of discharge of the material.

18. The apparatus of claim 10, wherein the impeller includes a plurality of blades, each blade having a hinged portion pivotably coupled to a fixed portion.

19. In connection with an apparatus for directionally discharging material, a method for discharging material, comprising:
    rotating an assembly disposed in a chamber defined by a housing, the chamber including at least one entry port into the chamber and a barrel defining at least one outlet, the assembly comprising a plate and at least one support member both rotatable about a central longitudinal axis;
    rotating an impeller to discharge the material from the at least one outlet; and
    wherein rotating the assembly and the impeller causes the plate to translate along the central longitudinal axis such that the plate retracts away from blocking the at least one entry port.

20. The method of claim 19, wherein the impeller includes a plurality of blades, each blade having a hinged portion pivotably coupled to a fixed portion.

21. The method of claim 19, wherein centrifugal force on pivotable members coupled to the plate causes the retraction of the plate.

22. The method of claim 19, wherein the support member includes extending arms for supporting flexible members and a central portion for supporting a spring about the central axis, the spring biasing the plate to block the at least one entry port into the chamber.

* * * * *